United States Patent [19]

Neumann et al.

[11] Patent Number: 5,030,244

[45] Date of Patent: Jul. 9, 1991

[54] PREPARATION OF GRANULES OF DYES, OPTICAL WHITENERS OR PHOTOACTIVATORS FROM AN AQUEOUS SUSPENSION OF NAPHTHALENE SULFONIC ACID-FORMALDEHYDE CONDENSATE DISPERSANT

[75] Inventors: Konrad Neumann, Rheinfelden, Fed. Rep. of Germany; Angelika Hayer, Riehen; Wolfgang Rehmann, Basel, both of Switzerland; Horst O. Brücker, Rheinfelden, Fed. Rep. of Germany

[73] Assignee: Ciba Geigy Corporation, Ardsley, N.Y.

[21] Appl. No.: 360,560

[22] Filed: Jun. 2, 1989

[30] Foreign Application Priority Data

Jun. 8, 1988 [CH] Switzerland .................. 2180/88

[51] Int. Cl.$^5$ .................. B01D 1/18; C09B 67/06; C11D 3/39; D06L 3/12

[52] U.S. Cl. .................. 8/526; 8/543; 8/654; 8/661; 8/673; 8/675; 8/680; 8/685; 8/687; 23/313 R; 106/316; 106/401; 106/902; 252/301.21; 540/139; 540/140

[58] Field of Search .................. 8/526; 252/301.21

[56] References Cited

U.S. PATENT DOCUMENTS 2,574,597 11/1951 Salvin et al. .................. 8/524
4,198,268 4/1980 Frei et al. .................. 8/524

FOREIGN PATENT DOCUMENTS 2127669 12/1971 Fed. Rep. of Germany .
2313003 9/1973 Fed. Rep. of Germany .
2813982 10/1978 Fed. Rep. of Germany .
1173806 12/1969 United Kingdom .
1254730 11/1971 United Kingdom .
1590154 5/1981 United Kingdom .
1426053 2/1986 United Kingdom .

OTHER PUBLICATIONS

R. Putzar et al., Chem. Abst. 76142375u pp. 80–81 (1972).
W. Happe et al., Chem. Abst.,–,6141.
E. Daubach et al., Chem. Abst., vol. 78, 31336d, pp. 74–75 (1973).

Primary Examiner—A. Lionel Clingman
Attorney, Agent, or Firm—George R. Dohmann; Edward McC. Roberts

[57] ABSTRACT

Process for the preparation of granules by spray-drying of an aqueous suspension having a solids content of greater than/equal to 30% and containing at least one dye, fluorescent brightener or photoactivator and one condensation product from naphthalenesulfonic acid and formaldehyde and, if necessary, further auxiliaries and/or diluents. The spray-dying is carried out at a feed pressure of 50–150 bar, the residual moisture content of the product is less than 4%, and the granules obtained are in particular very pressure resistant and abrasion resistant.

16 Claims, No Drawings

PREPARATION OF GRANULES OF DYES, OPTICAL WHITENERS OR PHOTOACTIVATORS FROM AN AQUEOUS SUSPENSION OF NAPHTHALENE SULFONIC ACID-FORMALDEHYDE CONDENSATE DISPERSANT

The present invention relates to a process for the preparation of granules, the granules prepared by the process, and their use for the preparation of dyebaths, padding liquors or printing pastes for the dyeing, printing, whitening or brightening of textile material.

Compared with commercial grades in powder form, granules have a number of advantages. Thus, they are especially low in dust to dust-free, have a high bulk density and are free-flowing. By virtue of these advantages, granulation processes have in the meantime also found wide application in the area of dye formulation. Examples of important granulation processes are spray and build-up granulation and also melt granulation and granulation in a fluidized bed.

As a result of the development of powerful spray-dryers, spray granulation has increasingly prevailed in the last few years over conventional granulation and drying processes. In particular the continuous operation and also the high throughput of product are the essential advantages of this drying process. However, a disadvantage is that in some cases very large quantities of solvent, in particular water, have to be evaporated, which involves a significant expenditure of energy, to obtain dry granules and that in many cases relatively porous granules which are not sufficiently pressure-resistant and abrasion-resistant are formed, leading to the destruction of the granules or to the formation of fine by abrasion on transport, which is extremely disturbing when these products are employed, for example in dyeing.

Surprisingly, it has now been found that, when special dispersants are used, a pumpable and sprayable or atomizable aqueous suspension having a high solids content is obtained, with which, if a certain residual moisture content of the product is maintained, surprisingly stable granules can be prepared which do not have the disadvantages mentioned; these granules are dust-free, free-flowing, do not form lumps, are wettable and readily soluble or dispersible in water and are distinguished by high bulk density, high mechanical strength, pressure resistance, high abrasion resistance and good free-flowing properties.

The present invention accordingly relates to a process for the preparation of granules by spray-drying of an aqueous suspension containing at least one dye, fluorescent brightener or photoactivator, inorganic and/or organic salts and a dispersant and, if necessary, further auxiliaries and/or diluents, wherein the suspension contains as dispersant at least one condensation product from naphthalenesulfonic acid and formaldehyde which has a low salt content, the solids content of the suspension is greater than or equal to 30%, and the drying temperatures selected are such that the residual moisture content of the granules obtained is less than 4%.

The invention further relates to the dye, photoactivator or fluorescent brightener granules obtainable by the process according to the invention.

Examples of suitable dyes are anionic and cationic dyes, such as metal complex, chromium developing and mordant dyes and in particular reactive dyes. They are in particular sulfo- or carboxyl-containing metal-free or metal-containing and metallizable mono-, dis- and polyazo-dyes, pyrazolone, thioxanthone, oxazine, stilbene and formazan dyes, anthraquinone, nitro, methine, triphenylmethane, xanthone, naphthazarin, styryl, azastyryl, naphthoperinone, quinophthalone and phthalocyanine dyes, and preferably those dyes which have at least one fibre-reactive radical in the dye molecule.

The anionic dyes are especially the alkali metal salts or ammonium salts of the so-called acid wool dyes, reactive dyes or the substantive cotton dyes of the azo, anthraquinone and phthalocyanine series. Examples of suitable azo dyes are metal-containing or metal-free mono- and disazo dyes and formazan dyes which contain one or more sulfo groups. Suitable anthraquinone dyes are especially 1-amino-4-arylaminoanthraquinone-2-sulfonic acids and phthalocyanine dyes are particularly sulfated copper phthalocyanines or phthalocyaninearylamides.

Suitable metal complex dyes are preferably sulfo- or carboxyl-containing metal complex dyes, for example 1:1 or 1:2 metal complexes of azo or azomethine dyes or metallized phthalocyanines, in particular copper and nickel phthalocyanines. The 1:1 and 1:2 metal complexes are preferably 1:1 nickel complexes, 1:1 cobalt complexes, 1:1 copper complexes, 1:1 chromium complexes, 1:1 iron complexes or symmetrical or asymmetrical 1:2 cobalt complexes, 1:2 iron complexes or 1:2 chromium complexes of, in particular, o-carboxy-o'-hydroxy-, o-hydroxy-o'-amino- or o,o'-dihydroxyazo dyes of the benzeneazobenzene, naphthaleneazonaphthalene, benzeneazonaphthalene, benzeneazopyrazolone, benzeneazopyridone or benzeneazoacetoacetamide type, where these groupings can be unsubstituted or even substituted. Examples of suitable substituents are: substituted or unsubstituted sulfonamides or sulfones, halogen or nitro.

The copper and nickel phthalocyanines to be used according to the invention are derived from customary mixtures of various degrees of sulfonation and preferably contain 2 to 3 or even 4 sulfated $\beta$-hydroxyalkyl- or -$\gamma$-hydroxyalkylsulfonamide groups, but can additionally also contain individual halogens and individual sulfonamide groups, where the sulfonamide groups are unsubstituted or substituted on nitrogen, for example by lower alkyl, such as methyl, ethyl, propyl or butyl, or lower hydroxyalkyl groups, such as 2-hydroxyethyl, 2-hydroxypropyl or 3-hydroxypropyl.

In the present process, the sulfo-containing azo dyes are advantageously used in the form of their metal salts, for example of the potassium salts or, in particular, the sodium salts.

Examples of suitable fibre-reactive groups contained in the reactive dyes are heterocyclic groups or the acyl group of a carboxylic acid, where these groups contain at least one halogen atom detachable under dyeing conditions. They are, for example, the following groups: s-triazinyl radicals which carry one or two halogen atoms, such as chlorine, fluorine or bromine atoms, on the triazine ring, pyrimidyl radicals which carry one to three halogen atoms, such as chlorine and/or fluorine atoms, or one or two arylsulfonyl or alkanesulfonyl groups on the pyrimidine ring, dichloroquinoxylinyl, 2-chlorobenzthiazolyl or chloroacetylamino groups or $\alpha,\beta$-dibromopropionylamino groups.

Furthermore, other examples of suitable fibre-reactive groups are halogenocyclobutane, mono- or bis($\gamma$-halogeno-$\beta$-hydroxypropyl)amino groups, $\beta$-halogenoethylsulfamide radicals, β-halogenoethoxy groups, β-halogenoethylmercapto groups, γ-halogeno-β-hydroxypropylsulfamide radicals or 2,3-epoxypropyl groups.

The basic dyes are the customary salts and metal halide, for example zinc chloride, double salts of the known cationic dyes, especially the methine or azamethine dyes which contain, for example, an indolinium, pyrazolium, imidazolium, triazolium, tetrazolium, oxadiazolium, thiadiazolium, oxazolium, thiazolium, pyridinium, pyrimidinium or pyrazinium ring.

The heterocycles mentioned can be substituted or unsubstituted and/or non-fused or fused with aromatic rings. Furthermore, cationic dyes of the diphenylmethane, triphenylmethane, oxazine, thiazine and 1,2-pyran series and finally also dye salts of the arylazo and anthraquinone series are also suitable.

In addition to water-soluble dyes, dyes which are sparingly soluble to insoluble in water are also suitable. In terms of their colouristic properties, these are, for example, sulfur dyes or pigments, but in particular disperse and very particularly vat dyes which chemically belong to a wide range of classes.

The disperse dyes are, for example, carboxyl- and/or sulfo-free nitro, aminoketone, ketonimine, methine, polymethine, diphenylamine, quinoline, benzimidazole, xanthene, oxazine, aminonaphthoquinone or coumarin dyes and especially anthraquinone and azo dyes, such as monoazo or disazo dyes. The vat dyes are dyes which are applied in solid dispersed form to the fabric and are present again in water-insoluble form after the development.

Apart from individual dyes, it is of course also possible to granulate dye mixtures by the process according to the invention, in which combinations of dyes which are insoluble or sparingly soluble in water with water-soluble dyes are also suitable, provided the granules are intended to be used for the dyeing of mixed fabric, for example made of polyester/cotton.

Suitable photoactivators are preferably metallized phthalocyanines, especially aluminium phthalocyanines and zinc phthalocyanines.

The dyes and photoactivators to be used according to the invention are known and can be prepared by methods known per se.

The present process is especially used for the granulation of fluorescent brighteners, which can belong to a wide range of chemical classes. Amphoteric, anionic or cationic brighteners which are water-soluble or sparingly soluble to insoluble in water are suitable, for example from the class of distyrylbenzenes or distyrylbiphenyls, coumarins, benzocoumarins, pyrazines, pyrazolines, oxazines, mono- or dibenzoxazolyl or mono- or dibenzimidazolyl compounds and naphthalimides, styrene, naphthotriazole and v-triazole derivatives, especially also stilbene compounds, such as cyanuric derivatives of 4,4'-diaminostilbene-2,2'-disulfonic acid.

The fluorescent brighteners to be used according to the invention are known (for example EP-A No. 59,684, DE-A No. 2,159,469, EP No. 19,078) and can be prepared by known methods.

The dyes, fluorescent brighteners or photoactivators are used in amounts of 98 to 5 percent by weight, relative to the solids content, preferably 90 to 45%, and especially 85 to 60%, for example in the form of the water-moist press cake, the synthesis solution or suspension, the concentrated aqueous preparation, the synthesis melt, as water-containing oil or even as a dry powder.

The suspension to be sprayed contains as further component 1 to 30 percent by weight, relative to the solids content, preferably 1 to 20%, and especially 1 to 10%, of a condensation product having a low salt content from naphthalenesulfonic acid and formaldehyde, for example the sodium salt and/or potassium salt of the condensation product of naphthalenesulfonic acid with formaldehyde, of the formula

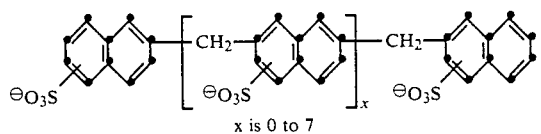

x is 0 to 7

Furthermore, the suspension contains organic salts, for example sodium acetate, and/or inorganic salts, for example sodium chloride, lithium chloride, ammonium chloride, sodium carbonate, sodium bicarbonate, monosodium, disodium or trisodium phosphate, disodium hydrogen phosphate, sodium tripolyphosphate, polyphosphates, sodium nitrate, sodium sulfate, ammonium sulfate, potassium sulfate, lithium sulfate or sodium hydrogen sulfate. Preference is given to sodium sulfate, potassium sulfate and ammonium sulfate and sodium chloride, potassium chloride and ammonium chloride. The salts are used, for example, in amounts of 1 to 50 percent by weight, preferably in amounts of 2 to 40 percent by weight, especially 5 to 30%, and in particular 15 to 30%, relative to the solids content.

Depending on the water content of the components used, a large or small amount of water is additionally required to adjust the solids content in the suspension to greater than/equal to 30%. Accordingly, water, if required, is added to the starting mixture before the spray-drying or atomization. The solids content of the suspension is preferably 30% to 70%. Especially it is 40% to 70% and in particular 45% to 60% for the suspension of a brightener and 30% to 45% for the dye suspensions. The suspension can be readily pumped and sprayed without difficulty at temperatures of 20° to 50° C.

In addition, further surface-active substances can be used individually or in a mixture. The amounts used are in general 1 to 10 percent by weight, relative to the dye content, preferbly 1 to 5%.

Examples of suitable substance are: wetting or dispersing agents of the anionic, cationic or nonionic type, such as ligninsulfonate, dinaphthylmethanedisulfonic acid, sodium dioctyl sulfocuccinate, dibutylnaphthalenesulfonate, dodecylbenzenesulfonate, laurylpyridinium chloride, alkylphenol polyglycol ether, stearyldiphenyloxyethyl-diethylenetriamine and ethylene oxide adducts.

Preference is given to anionic surface-active substances such as condensation products of aromatic sulfonic acids with formaldehyde, for example condensation products from formaldehyde, naphthalenesulfonic acid and benzenesulfonic acid, or from crude cresol, formaldehyde and naphthalenesulfonic acid, and in particular condensation products from phenolsulfonic acid, cresolsulfonic acid or naphtholsulfonic acid and formaldehyde, and especially ligninsulfonates (sulfite-/cellulose waste liquor) and oxyligninsulfonates; furthermore, polymerization products from unsaturated acids, such as the polymerization product of acrylic acid or methacrylic acid of the formula

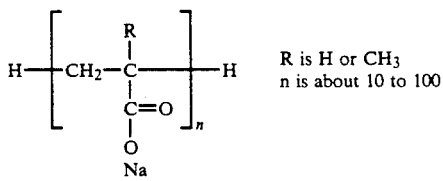

R is H or CH$_3$
n is about 10 to 100

The use of nonionic surfactants has proven advantageous. Suitable nonionic surfactants are in particular: polyethylene glycols having a molecular weight of preferably 200 to 1000; mixed polymers from ethylene oxide and propylene oxide (so-called block polymers); symmetrical acetylenes, for example the tertiary acetylene glycol compound of the formula

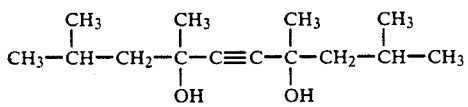

and reaction products from fatty acids having from 8 to 22 carbon atoms and amines or hydroxyalkylamines, for example coconut fatty amide, oleic diethanolamide or coconut fatty ethanolamide.

Adducts from, for example, 5 to 200 mole, preferably 20 to 100 mole, of alkylene oxides, especially of ethylene oxide, where individual ethylene oxide units can be replaced by substituted epoxides, such as styrene oxide and/or propylene oxide, with higher fatty acids, preferably having 8 to 22 carbon atoms, for example adducts from fatty acids (e.g. oleic acid or ricinoleic acid) and 10 to 30 mole of ethylene oxide, preferably an adduct from oleic acid and 20 mole of ethylene oxide, or a ricinoleic ester with 15 mole of ethylene oxide, or adducts of alkylene oxides with satured or unsaturated alcohols, mercaptans or amines having 8 to 20 carbon atoms or with alkylphenols or alkylthiophenols whose alkyl radicals have at least 7 carbon atoms, for example fatty alcohol polyglycol ethers, particularly those from an aliphatic hydrocarbon radical having 8 to 22 carbon atoms and etherified with 5 to 200 mole, preferably with 20 to 100 mole, of ethylene oxide, such as cetyl alcohol etherified with 25 mole of ethylene oxide, stearyl alcohol etherified with 25 to 80 mole of ethylene oxide and oleyl alcohol etherified with 20 to 80 mole of ethylene oxide; and hydroabietyl alcohol etherified with 25 to 100 mole of ethylene oxide or p-nonylphenol etherified with 9 mole of ethylene oxide have proved to be particularly advantageous.

The aliphatic hydrocarbon radicals of the fatty alcohol polyglycol ethers are derived from higher alcohols having 8 to 22 carbon atoms, for example decyl, lauryl, tridecyl, myristyl, cetyl, stearyl, oleyl, arachidyl or behenyl alcohol.

Examples of suitable higher fatty acids having 8 to 22 carbon atoms are caprylic, capric, lauric, myristic, palmitic, stearic, arachidic, behenic, coconut fatty (C$_8$–C$_{18}$), decenoic, dodecenoic, tetradecenoic, hexadecenoic, oleic, linoleic, linolenic, ricinoleic, eicosenoic, docosenoic or clupanodonic acid.

In addition to these surface-active substances, further auxiliaries which can be used in total amounts of 1 to 50 percent by weight, preferably 1 to 30%, relative to the solids content, are water softeners, antifoams, binders and/or solubilizing agents and, if necessary, 0.5 to 10 percent by weight, preferably 0.5 to 5%, relative to the solids content, of dust-removing agents. These agents should be capable of being dried under the conditions given and furthermore they must not interact with the dyes, fluorescent brighteners or photoactivators.

Examples of suitable binders to be used according to the invention are:

Sucrose, alginates, gelatin, glycerol, glycols, carboxymethyl-cellulose, polyvinylpyrrolidones, polyvinyl alcohols and starch and starch degradation products which contain at least 5 hydroxyl groups per molecule, such as sorbitol, hydrated dextrose, glucose, lactose, mannitol, bone glue, mannose or, preferably, dextrin. They are preferably used in amounts of 1 to 40 percent by weight, especially 1 to 20%, relative to the solids content.

Suitable dust-removing agents are the customary ones, for example homogeneous mixtures of mineral oils and emulsifiers having unlimited emulsifying properties with water, for example paraffin oil and mineral oils, if appropriate emulsified with suitable emulsifiers, for example fatty acid (alcohol)/ethylene oxide adducts, especially a mixture of mineral oil or mineral oil sulfonic acid and an emulsifier or of paraffin oil and a nonionic emulsifier. It is also possible to apply the dust-removing agent afterwards to the spray-dried product.

Solubilizing agents to be used according to the invention are urea, tetramethylurea, caprolactam, glycine, trimethylbetain, toluenesulfonic acid, xylenesulfonic acid or dodecylbenzenesulfonic acid or salts thereof, especially sodium salts, and auxiliaries having an increased hydrotropic effect, such as the auxiliary mixtures described in German Offenlengungsschrift No. 2,802,327. The solubilizing agent is preferably used in amounts of 1 to 20 percent by weight, relative to the solids content.

For spray-drying or also for atomizing-drying, the suspension is injected into a drying tower via a nozzle, in particular a single-component nozzle, preferably a swirl chamber nozzle, and at a feed pressure of 20–150 bar, in the case of the brightener suspensions preferably 60–120 bar and especially 60–100 bar, in the case of the dye suspension preferably 20–35 bar.

The gas inlet temperature of the dryer is 150° to 450° C., in the case of the brightener suspensions preferably 350° to 400° C., in the case of the dye suspension preferably 150°–200° C., the gas outlet temperature is 80° to 120° C., preferably 90° to 110° C., during which the atomized material to be dried preferably moves in the direction of the drying air (co-current operation). A suitable gas is in particular air.

The drying is carried out in such a manner that the residual moisture content of the product is less than 4% and the temperature of the product does not exceed a specific critical limit value, above which the granules undergo irreversible changes.

Granules having a particle size of up to 1000 μm can be obtained by this drying process; preferably, the particle size is in the range from 100 to 300 μm. In a preferred embodiment, the fines which have a particle size of less than 50 μm are separated off, for example through cyclones, and recycled.

The granules according to the invention are particularly suitable for the preparation of aqueous dye liquors or brightener liquors and printing pastes, which can be used for the dyeing, printing, whitening and brightening of a large range of different textile materials.

The examples which follow are intended to illustrate the invention; parts and percentages are by weight.

Pressure Resistance Test

A tape (1.2×1.3 cm) which is adhesive on both sides is bonded to a glass microscope slide (7.5×2.5 cm). A layer of granules of about the same diameter is applied on top of it and covered with a further microscope slide. This "sandwich" is placed on a glass plate (25×15 cm) and carefully loaded with a 2 kg weight for 15 s. A test with a further load is carried out on half of the area (0.6×0.65 cm). The upper microscope slide is then removed, the granules are viewed under the microscope at an enlargement of about 12.5, the number of destroyed granules - including those which have an indentation - is estimated and recorded in %.

Abrasion Test

In a drum-type rotating apparatus equipped with baffles, 40 g of dye granules are rotated at 25 rpm for 200 minutes. After the rotation, the abrasion is evaluated visually. The test substance is transferred from the drum into a beaker, and from there 2 samples of 10 g each are removed for the dust test. The dust test is carried out by the funnel method, compared with untreated substance.

EXAMPLE 1

16,565 kg of the fluorescent brightener of the formula

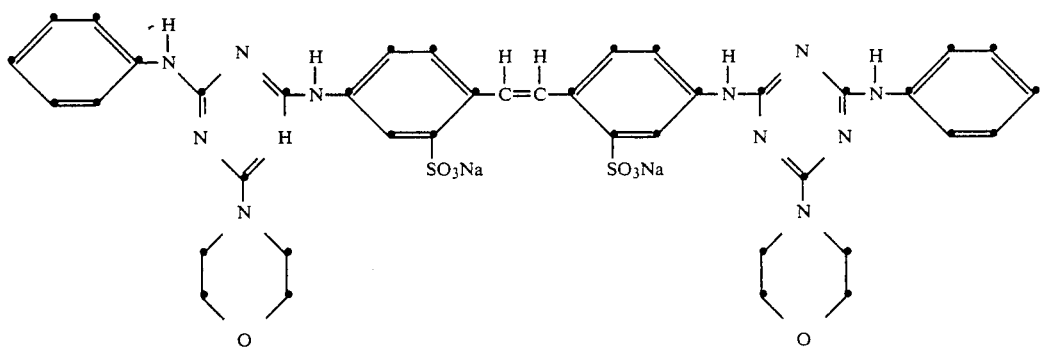

are slurried as an aqueous press cake (solids content 60%) with 6,955 l of water, 3,360 kg of sodium sulfate and 280 kg of the Na salt of the condensation product from naphthalenesulfonic acid and formaldehyde (dispersant), brought to a slurry temperature of 30° to 40° C. and adjusted to a pH of 8 to 10 by means of NaOH, and dried by atomization in a cylindrical drying tower (height 11.4 m; diameter 4.5 m), which is equipped with 6 swirling chamber nozzles. The solids content of the suspension is 50%.

| | |
|---|---|
| Feed pressure | 65–75 bar |
| Air inlet temperature | 400° C. |
| Air outlet temperature | 100° C. |
| Amount of the drying air about | 10,000 Nm³/h |
| Water for evaporation | 1,000 kg/h |
| Residual moisture content of the product | 3% |

This gives 11,900 kg of granules - the fines (about 15%) which are deposited by means of waste air are recycled - having very good pressure resistance. According to the pressure resistance test, 75% of the granules remain intact. (Average value of two measurements of the entire area and half the area in each case)

EXAMPLE 2

4,970 kg of dry crude dye of the formula

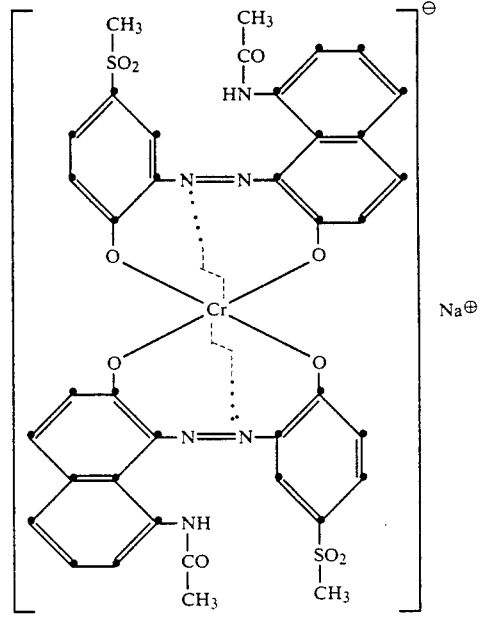

are thoroughly mixed as moist material (=15,061 kg of press cake, solids content 33%) with 887 kg of the Na salt of the condensation product from naphthalenesulfonic acid and formaldehyde (dispersant), 285 kg of sodium 1-benzyl-2-heptadecylbenzimidazoledisulfonate and 510 kg of the addition product from 4-nonylphenol and 9.7 mole of ethylene oxide.

Solids content of the slurry: 39.7%.

The suspended dye is milled to a particle fineness of 1–3 μm in a glass bead mill (diameter of the beads 2 mm).

Should the viscosity be too high during the slurrying or during the wet milling, the suspension can be diluted with water.

After the wet milling, the suspension is screened through a screen (mesh size 200 μm) and standardized to a commercial strength. The suspension is then dried by atomization in the nozzle atomizer, which is described in Example 1, at an air inlet temperature of 170° C. and an air outlet temperature of 100° C. The other conditions are as in Example 1.

This gives 4,830 kg of dye granules, which have good pressure resistance. Residual moisture content of the granules: 3.9% by weight. The fines (particle size <60 μm) which are deposited from the waste air are recycled.

Evaluation of the dye granules according to the abrasion test: dust rating 4-5 (good-very good).

EXAMPLE 3

The vat dye of the formula

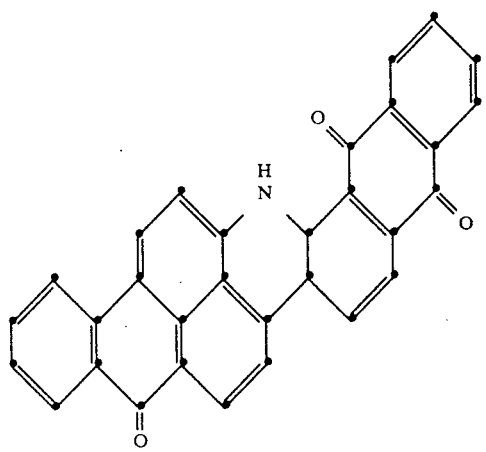

is standardized in accordance with the process described in Example 2. The amounts used in this example are 3654 kg of crude dye, 1106 kg of the Na salt of the condensation product from naphthalenesulfonic acid and formaldehyde and 2279 kg of the Na salt of ligninsulfonic acid. The residual moisture content of the granules is 3.9%.

This gives dye granules which have good granule stability according to the abrasion test.

Evaluation according to the abrasion test: dust rating 4-5 (good-very good).

EXAMPLE 4

The disperse dye of the formula

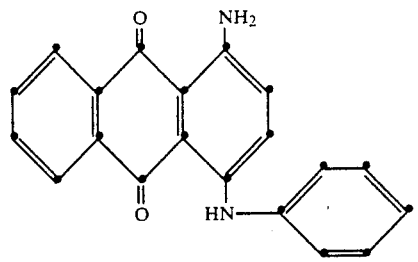

is standardized in accordance with the process described in Example 2. The formulation is modified to such an extent that 1658 kg of crude dye, 2183 kg of the Na salt of the condensation product from naphthalenesulfonic acid and formaldehyde and 81 kg of sodium 1-benzyl-2-heptadecylbenzimidazoledisulfonate are used. The residual moisture content of the granules is 3.9%.

The dye granules obtained have good granule stability according to the abrasion test.

Evaluation according to the abrasion test: dust rating 4-5 (good-very good).

EXAMPLE 5

3,240 kg of crude dye (dry weight) of the formula

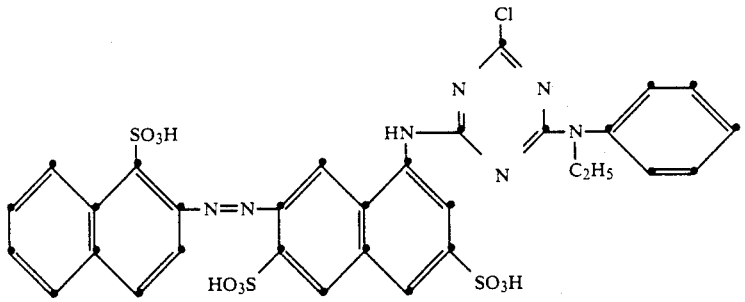

are slurried as a press cake in an aqueous solution containing 428 kg of the Na salt of the condensation product from naphthalenesulfonic acid and formaldehyde and
270 kg of sodium chloride.

| Weight of the slurry: | 12,400 kg |
| Solids content of the slurry: | 33.3% |

For homogenization, the slurry is pumped through a dispersing apparatus (Triganal mill, Supraton, Gorator or Dispax) until all suspended particles are smaller than 100 μm.

The drying by atomization is carried out in the nozzle atomizer which is described in Example 1, under the following conditions:

| Feed pressure | 20 bar |
| Air inlet temperature | 190° C. |
| Air outlet temperature | 92° C. |
| Residual moisture content of the granules | 3.9% |

After the drying by atomization, 3,650 kg of granules are obtained. The granules show good pressure resistance, which is evaluated by means of the abrasion test.

Evaluation according to the abrasion test: dust rating 4–5 (good–very good). The dust portion is utilized again in the subsequent slurry.

What is claimed is:

1. A process for the preparation of granules by spray-drying of an aqueous suspension containing at least one dye, fluorescent brightener or photoactivator, inorganic and/or organic salts and a dispersant and, if necessary, further auxiliaries and/or diluents, wherein the suspension contains as dispersant at least one condensation product from naphthalenesulfonic acid and formaldehyde, said condensation product having low salt content the solids content of the suspension is greater than/equal to 30%, and the drying temperatures selected are such that the residual moisture content of the granules obtained is less than 4%.

2. A process according to claim 1, wherein the suspension contains organic and/or inorganic salts in amounts of 1 to 50 percent by weight, relative to the solids content.

3. A process according to claim 1, wherein the suspension contains at least one condensation product from naphthalenesulfonic acid and formaldehyde in amounts of 1 to 30 percent by weight, relative to the solids content.

4. A process according to claim 1, wherein the solids content of the aqueous suspension is 30–70%.

5. A process according to claim 1, wherein the solids content of the aqueous suspension containing a brightener is 40–70%.

6. A process according to claim 1, wherein the solids content of the aqueous suspension containing a brightener is 45–60%.

7. A process according to claim 1, wherein the solids content of the aqueous suspension containing a dye is 30–45%.

8. A process according to claim 1, wherein in the case of the brightener suspensions the feed pressure is 50–150 bar.

9. A process according to claim 1, wherein in the case of the brightener suspensions the feed pressure is 60–120 bar.

10. A process according to claim 1, wherein in the case of the dye suspensions the feed pressure is 20–35 bar.

11. A process according to claim 1, wherein the gas inlet temperature is 150° C. to 450° C. and the gas outlet temperature is 80° C. to 120° C.

12. A process according to claim 1, wherein in the case of the brightener suspensions the gas inlet temperature is 350° C. to 400° C. and the gas outlet temperature is 90° C. to 110° C.

13. A process according to claim 1, wherein in the case of the dye suspensions the gas inlet temperature is 150° C. to 200° C. and the gas outlet temperature is 90° C. to 110° C.

14. A process according to claim 1, wherein the gas and product streams are moving in co-current and the fines are separated off and recycled.

15. A process according to claim 1, wherein an aqueous suspension containing a brightener having a solids content of 50% is spray-dried at a feed pressure of 60–90 bar, a gas inlet temperature of 350°–400° C. and a gas outlet temperature of 90°–110° C. and the residual moisture content of the product is <3%.

16. Granules obtainable by the process according to claim 1.

* * * * *